Patented July 21, 1931

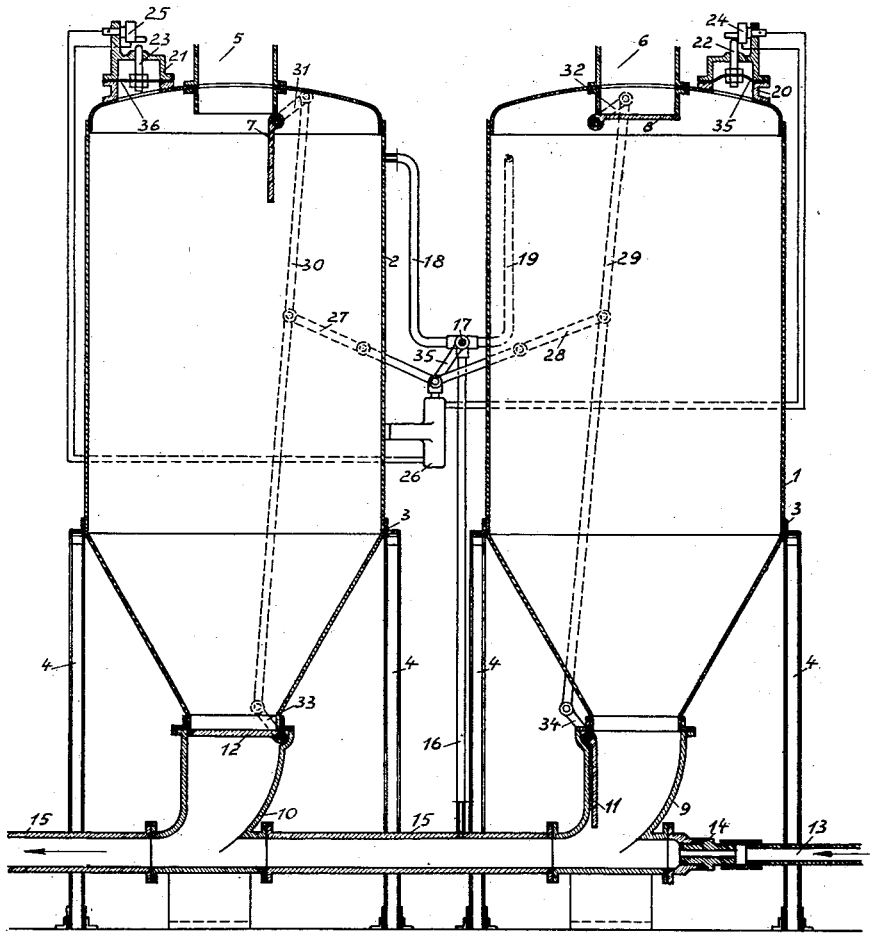

1,815,403

UNITED STATES PATENT OFFICE

PAUL GOEBELS, OF DESSAU, GERMANY, ASSIGNOR TO FIRM G. POLYSIUS AKTIEN-GESELLSCHAFT, OF DESSAU, GERMANY

APPARATUS FOR CONVEYING BULK-GOODS

Application filed September 17, 1928, Serial No. 306,537, and in Germany September 19, 1927.

This invention relates to an apparatus for conveying bulk goods, comminuted material and the like wherein two or more containers or tanks utilizing air pressure are employed for conveying the material. The number of containers may depend upon the quantity of material to be conveyed or the number of different kinds of materials to be conveyed, or upon expediency.

In the known conveying apparatus employing pressure containers and air pressure, the tanks having inlets at the top and outlets at the bottom are alternately filled and emptied, the intake and outlet valves being alternately opened and closed and the air pressure being employed in the container above the material while the inlet valve is closed and the outlet valve is open. Applicant's copending application, Serial Number 330,081, Letters Patent No. 1,773,619, dated August 19, 1930, discloses such an apparatus.

The present invention is an improvement over the above arrangement and makes the operation of the inlet valves and outlet valves automatically operable at the time when tanks are emptied and other tanks are ready for supplying material.

In the operation of tanks employing air pressure, the following conditions are found to exist. During the filling operation of a tank, atmospheric pressure prevails in the interior thereof. When the filling operation is complete, the inlet valve closed and the outlet valve opened, air is introduced above the material which produces pressure greater than atmospheric in the interior of the tank. The air under pressure may be supplied to the tank by properly connected conduits from any source and may be supplied, as illustrated in the accompanying drawing, from the conduit which introduces the air into the conveying conduits below the outlet valves of the tanks. The pressure in the tank increases or decreases in proportion to the resistance offered by the material in leaving the tank. This pressure becomes zero when the tank and conveying conduit become empty. The present invention utilizes this change in pressure to automatically operate the valves of that particular tank and the valves of one or more other tanks by closing the outlet valves and opening the inlet valves to emptied tanks and opening the outlet valves and closing the inlet valves of filled tanks ready to supply material to the conveying conduits.

In the accompanying drawing, I have illustrated an apparatus constructed in accordance with my invention, said apparatus comprising two pressure containers adapted for carrying out the conveying operation. It should be understood that any number of conveyors may be employed.

The two containers 1 and 2 are firmly supported on the standards or frame 4 by means of flanges 3 secured to said containers. The containers are provided with inlet openings 5 and 6 for the bulk material which may be closed and opened by means of the valves 7 and 8 respectively. Outlets 9 and 10 with valves 11 and 12 are provided in the bottom of the tanks and serve to open or close communication between the containers and a lower conveying conduit 15. A conduit 13 having a nozzle 14 for the introduction of air under pressure is connected to the conveying conduit 15. A branch conduit 16 is connected, in the preferred embodiment, with the conduit 15 but may be connected to the conduit 13 instead. Conduit 16 joins a three way valve 17 which communicates with the containers 1 and 2 through conduits 18 and 19, respectively.

By the above arrangement, the pressure existing in the conduit 15 will automatically adjust itself in proportion to the resistance exerted by the material therein, which pressure will be transmitted through conduit 16 to the container or containers having material therein. The same effect would be produced if the conduit 16 were connected to the conduit 13 or with a separate conduit having air pressure.

In the illustrated embodiment one of two containers is being filled while the other is under operation of supplying material to the conveying conduit 15. According to the present invention, the valves of two containers are automatically operated in alternation, and while the inlet and outlet valves of one tank are open and closed, respectively, the inlet and outlet valves of the other container are closed and open, respectively. All the valves operate substantially simultaneously. By the present invention, the loss of pressure in an emptied container operates the valves so as to automatically transfer the pressure to a filled container.

For the accomplishment of this transfer of pressure, each container is provided with a pressure responsive device which, through proper transmission devices, automatically controls the opening and closing of the valves including the air pressure inlet valve. Any number of devices for accomplishing such a result will be obvious to the skilled mechanic, only one being described and illustrated by the applicant.

The pressure containers 1 and 2 are provided with small extensions 20 and 21, respectively, in which are mounted membranes 35 and 36 which control mercury-contact switches 24 and 25 by means of rods 22 and 23 attached to said membranes. The switches 24 and 25 are electrically connected to a common reversing means comprising a double lifting magnet 26 which operates with known auxiliaries, for instance, levers 27 and 28 which actuate the links 29 and 30, which in turn actuate the valves 7, 8, 11 and 12 through arms 31, 32, 33, and 34. The three way valve 17 is operatively connected to the magnet 26 through rod 35.

The closing of the switch above one of the containers causes the movement at the magnet in an upward direction and a closing of the switch above the other container causes a downward movement, each movement causing an opening or closing of each inlet valve to the containers.

The mode of operation of the device during reversal of the operation is as follows:

With reference to the drawing, the container 1 is filled with bulk material and is ready to be emptied. Air pressure introduced from conduit 15 through conduit 16, valve 17 and conduit 19 exists in the container 1 above the material. This pressure causes the membrane 35 to be extended in the illustrated position with the result that the mercury-contact switch makes contact and the magnet 26 is maintained in the lower position shown.

At the same time, the container 2 is in condition for filling, the valve 7 being open and the valve 12, closed. The membrane 26 is in normal position and does not cause contact in the switch 23.

When the container 1 becomes empty, the pressure is lost through the outlet 9, the membrane 35 drops and breaks contact in the switch 24, thereby interrupting the current in the magnet 26 through this side and at the same time causing the magnet to receive current from the other side whereby the magnet 26 will move to the upper position and valves 8 and 12 will open and valves 7 and 11 will close. By the same movement the valve 17 is actuated in such manner as to transfer pressure from conduit 19 leading to tank 1 to conduit 18 leading to tank 2. The container 2, after such change, operates to supply material to the conveyor conduit 15 while the container 1 is open for filling.

Having thus described my invention, it must be understood that the disclosed example is but a single embodiment and that modifications may be made without departing from the spirit of the invention so long as they come within the scope of the appended claims.

Having thus described the invention, what is claimed as new and desired to be secured by Letters Patent is:

1. An apparatus for conveying bulk material comprising, in combination, a plurality of containers, a common discharge conduit for conveying material from said containers, valves controlling discharge from said containers to said conduit, reversing means for opening one valve and closing the other valve, pressure sensitive diaphragms in the wall of each container and connections from said diaphragms to the reversing means adapted to reverse the position of the valves due to the pressure changes in the containers.

2. An apparatus for conveying bulk material comprising, in combination, a plurality of containers having valve controlled inlets and outlets for bulk material, inlet conduits connected to said containers for the introduction of air under pressure, common reversing means for actuating said outlet valves, and pressure sensitive means connected to said reversing means adapted to reverse the position of the said outlet valves in response to pressure changes in said containers.

3. An apparatus according to claim 2 in which said material outlets are connected to a common discharge conduit.

4. An apparatus according to claim 2 in which said material outlets are connected to a common discharge conduit, said conduit being provided with an inlet adapted for the introduction of air under pressure.

5. An apparatus of the class described, comprising, in combination, a plurality of containers having valve controlled inlets and outlets for material to be conveyed and inlets for introduction of air under pressure, common reversing means connected to said material inlet and outlet valves for actuating said valves, and pressure sensitive means connected to said reversing means adapted to open and close said material inlet and outlets in response to pressure changes in said containers.

6. An apparatus of the class described, comprising, in combination, a plurality of containers having valve controlled inlets and outlets for material to be conveyed and inlets for introduction of air under pressure, common reversing means connected to said material inlet and outlet valves for actuating said valves, and pressure sensitive means connected to said reversing means and to said air inlets, whereby passage through each of said inlets and outlets may be controlled in response to pressure changes in said containers.

7. An apparatus for conveying bulk material comprising, in combination, a plurality of containers, valve controlled inlets and outlets for the bulk material, conveying conduit means connected to said outlets, means for introducing air under pressure into said conduit means, means for by-passing air from said conduit means into said containers, common reversing means for actuating said outlet valves, and pressure sensitive means connected to said reversing means adapted to reverse the position of said outlet valves in response to pressure changes in said containers.

8. An apparatus according to claim 2 in which said common reversing means is electrically controlled and said pressure sensitive means is a diaphragm which upon movement makes or breaks the electrical circuit passing through said common reversing means.

9. An apparatus according to claim 5, in which said common reversing means is electrically controlled by connection to said pressure sensitive means.

10. An apparatus according to claim 6 in which said common reversing means is electrically controlled in response to movements in said pressure sensitive means.

11. An apparatus for conveying bulk material comprising, in combination, a duality of containers, valve controlled inlets and outlets for bulk material, means for introducing air under pressure into said containers, common reversing means so connected to said outlet valves that while one is open the other is closed, and pressure sensitive means connected to said reversing means, adapted to reverse the position of said outlet valves in response to pressure changes in said containers.

12. An apparatus for conveying bulk material comprising, in combination, a duality of containers, valve controlled inlets and outlets for bulk material, means for introducing air under pressure into said containers, common reversing means connected to said inlet and outlet valves in such manner that while the inlet and outlet valves of one container are open and closed, respectively, the inlet and outlet valves of the other container are closed and open, respectively, and pressure sensitive means adapted to control the position of the said inlet and outlet valves in response to pressure changes in said containers.

13. An apparatus according to claim 12 in which said means for introducing air comprises two inlet conduits connected from substantially at the top of said containers to a three way valve controlled by said common reversing means and adapted to alternately introduce air into said containers, and to introduce the air to the containers only while the inlet valves for the introduction of bulk material are closed.

In testimony whereof I affix my signature.
PAUL GOEBELS.